US008468974B2

(12) United States Patent
Lindgren

(10) Patent No.: US 8,468,974 B2
(45) Date of Patent: Jun. 25, 2013

(54) AQUACULTURE CAGE SCREEN

(76) Inventor: Peter B. Lindgren, Pompano Beach, FL (US)

( * ) Notice: Subject to any disclaimer, the term of this patent is extended or adjusted under 35 U.S.C. 154(b) by 0 days.

(21) Appl. No.: 12/779,066

(22) Filed: May 13, 2010

(65) Prior Publication Data

US 2011/0277692 A1    Nov. 17, 2011

(51) Int. Cl.
*A01K 97/20* (2006.01)
*A01K 61/00* (2006.01)
(52) U.S. Cl.
USPC ............................................. 119/223
(58) Field of Classification Search
USPC ............... 119/215, 223, 208, 226, 228, 239, 119/240, 224; 24/288; 47/66.5, 86
See application file for complete search history.

(56) References Cited

U.S. PATENT DOCUMENTS

| | | | | |
|---|---|---|---|---|
| 2,821,047 A * | 1/1958 | Ruiz | ............................... | 43/102 |
| 3,050,802 A * | 8/1962 | Imparato | ........................ | 24/288 |
| 3,632,269 A * | 1/1972 | Doviak et al. | ................. | 425/362 |
| 3,666,609 A * | 5/1972 | Kalwaites | ..................... | 428/134 |
| 3,691,994 A * | 9/1972 | McPherson | .................... | 119/223 |
| 4,062,995 A * | 12/1977 | Korpman | ...................... | 428/134 |
| 4,377,987 A * | 3/1983 | Satre | ............................. | 119/241 |
| 4,381,326 A * | 4/1983 | Kelly | ............................ | 428/134 |
| 4,680,215 A * | 7/1987 | Mercer | ......................... | 428/107 |
| 4,688,024 A * | 8/1987 | Gadde | .......................... | 340/550 |
| 4,832,222 A * | 5/1989 | Storton | ............................ | 220/6 |
| 5,009,189 A * | 4/1991 | Neff | .............................. | 119/200 |
| 5,156,495 A * | 10/1992 | Mercer | .......................... | 405/262 |
| 5,207,017 A * | 5/1993 | Litrico | ............................. | 43/100 |
| 5,359,962 A * | 11/1994 | Loverich | ....................... | 119/223 |
| 6,093,663 A * | 7/2000 | Ouellette et al. | ................... | 442/5 |
| 6,481,378 B1 * | 11/2002 | Zemach | ......................... | 119/223 |
| 6,692,606 B1 * | 2/2004 | Cederblad et al. | ........ | 156/244.11 |
| 6,877,932 B2 * | 4/2005 | Prevost | ........................... | 405/38 |
| 6,917,294 B2 | 7/2005 | Larsen | | |
| RE39,379 E * | 11/2006 | Wechsler | ......................... | 428/99 |
| 7,284,501 B2 * | 10/2007 | Page | ............................. | 119/223 |
| 7,293,530 B2 * | 11/2007 | Italiano | ......................... | 119/498 |
| 7,523,720 B1 * | 4/2009 | Lecy et al. | .................... | 119/832 |
| 2004/0174266 A1 | 9/2004 | Larsen | | |
| 2005/0241590 A1 * | 11/2005 | Koznarek et al. | ............. | 119/270 |

FOREIGN PATENT DOCUMENTS

| | | |
|---|---|---|
| AU | 637128 B2 | 5/1993 |
| WO | WO0074476 | 12/2000 |

* cited by examiner

*Primary Examiner* — Rob Swiatek
*Assistant Examiner* — Ebony Evans
(74) *Attorney, Agent, or Firm* — McHale & Slavin, P.A.

(57) ABSTRACT

A fish cage formed from a molecularly oriented single strand filament that is crossed and welded at the intersections to make a net or screen configuration. The filament being molecularly oriented by stretching ratio of about 3:1 and has a cross section of the filament being at least 2 mm². The filament is an extruded thermoplastic material made from nylon, polyester, polyethylene, polyurethane or polypropylene having a preferred cross section in a D or oval shape to better facilitate welding the intersections. An antimicrobial or biocide may be added to the filament. The screen or net is preferably of a bright color such as yellow, green, white or a translucent white. The screen can also be formed by connecting small injection molded segments together thereby producing a larger screen.

11 Claims, 10 Drawing Sheets

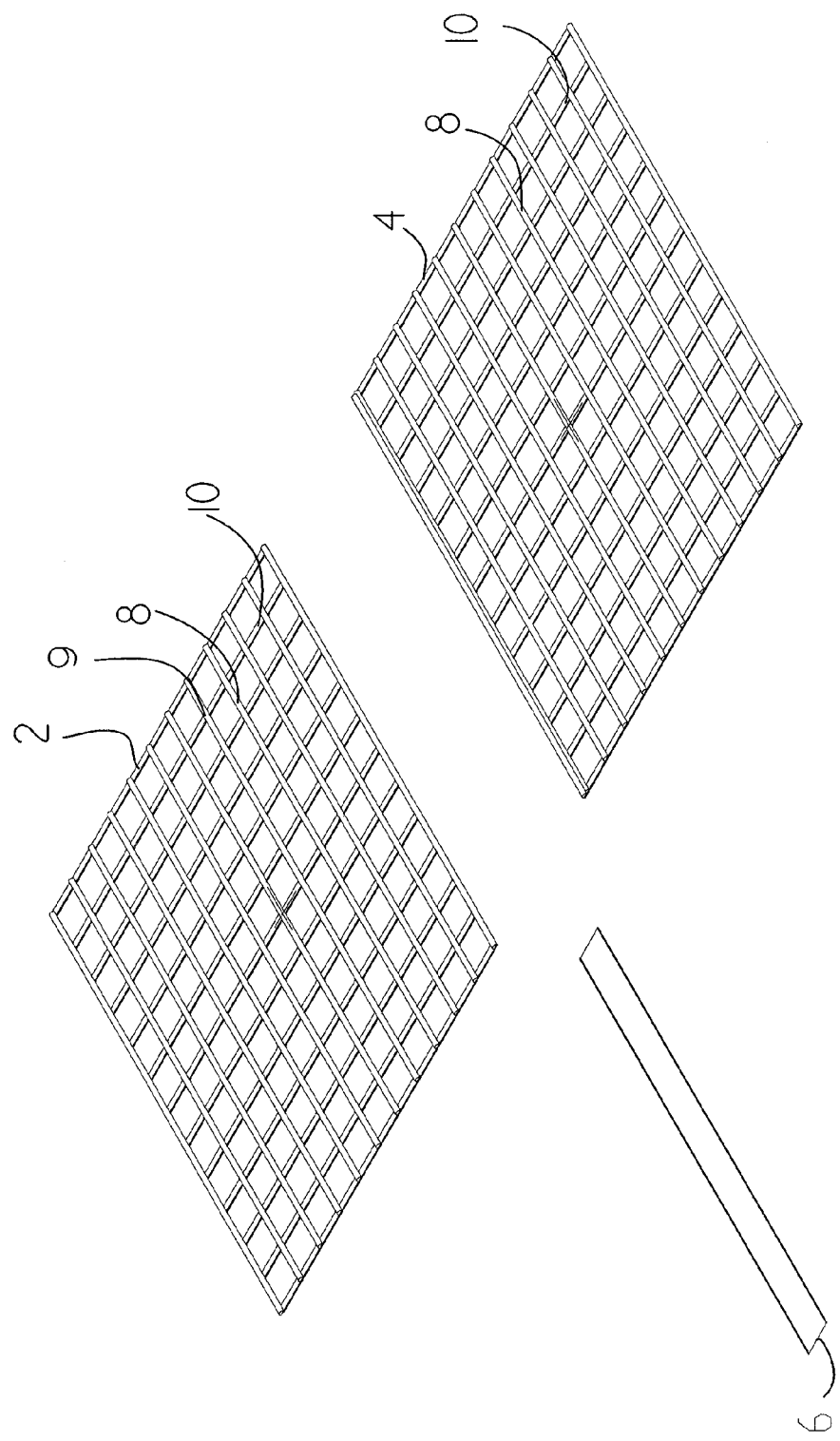

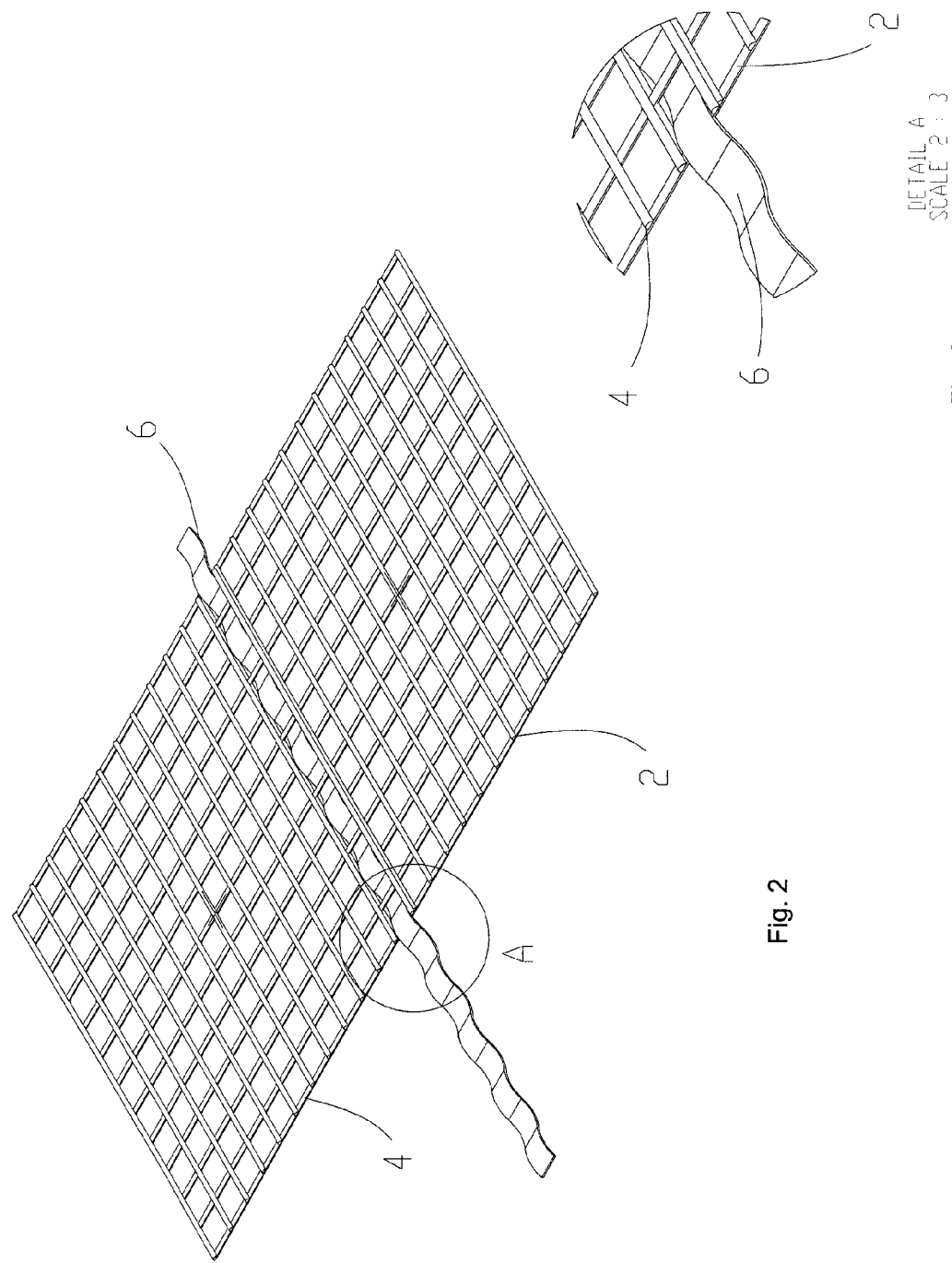

AQUACULTURE CAGE SCREEN

FIELD OF THE INVENTION

This invention is related to the field of open ocean aquaculture and in particular to an improved fish cage screen.

BACKGROUND OF THE INVENTION

Fish farming or open ocean aquaculture is the rearing of marine organisms under controlled conditions in exposed high energy ocean environments. The purpose of the open ocean aquaculture is to raise a species of fish in a controlled environment wherein the open ocean allows for the natural cleansing of the holding pen. The open ocean aquaculture facilities consist of cages, holding pens, or the like that can be free floating, secured to a structure, or lowered to the ocean bottom. Open ocean aquaculture also makes use of the vast area of the ocean wherein cage size is not limited, as compared to the placement of cages within bays or the like tightly boarded area. The fish farming industry has enjoyed a steady strong growth for many years and can produce sustainable high quality fish products.

Fish farming has been done for thousands of years, yet in many ways it is still in its infancy. Environmental concerns and labor rates of the developed countries are the new barriers for continued growth of the industry. Offshore aquaculture is among the fasted growing industries today. Fish consumption is rising and wild stocks are unable to meet demand. Many ocean species contain valuable omega 3 oils that are recommended by doctors for good health. These oils are not abundantly found in fresh water species. The health benefits of ocean fish will continue to drive demand for ocean grown fish for decades to come. Offshore aquaculture has not developed in the United States despite the fact that we have the largest Exclusive Economic Zone in the world at 3.4 million square miles.

Historically ocean water fish farming has been done in protected near shore areas where access to the cages has been very good and cleaning and maintaining cage screens has been affordable and not prohibitive due to open sea conditions, distance and increasing labor rates. The netting is usually coated with antifouling material. The nets are removed and cleaned every few weeks and re-dipped in antifouling material, and then reentered into the water. This process is presently under attack in Europe and Canada, because of the environmental impacts of the poisons introduced into the water during the cleaning process and while in use. Thousands of fish cages are doing this worldwide. The antifouling that reaches the ocean or bay floor reduces the ability of the floor to deal with by-products from the fish in the very worst cases. Antifouling paints are also under attack by environmentalist and the most effective antifouling paints are already banned in the U.S.

Today many countries have used and over used the acceptable protected aquaculture sites and are now forced to go offshore to expand. The U.S. is committed to develop an offshore aquaculture plan for federal waters. Most of the U.S acceptable sites are 10 to 70 miles offshore and in areas that are susceptible to severe weather. The solution for severe weather areas is underwater cages that are not affected by surface waves.

The netting from offshore underwater cages cannot be efficiently removed for cleaning. The current solution is to scrub the cage screen underwater to remove fouling. The use of divers is expensive and the small fibers of the net contain small amounts of growth after cleaning and re growth starts immediately.

Holding pens placed in off shore waters employ cages that are lowered and secured to the ocean bottom. Holding pens that are positioned near shore or in bays may consist of floating facilities. Extensive offshore floating facilities are currently found in most costal countries such as Australia, Chile, China, France, Ireland, Italy, Japan and Norway. The United States has only a few open ocean facilities while other countries are experimenting with such facilities such as Panama, Korea, Spain, Mexico, Brazil and other Central and South America countries. Labor offshore has many difficulties including poor working conditions, health risk and transportation costs. This is especially true for underwater cages where divers are required for almost all of the work.

Environmental risk is the most common reason cited for lack of fish farming in the United States. Another reason is suggested likelihood of disease in densely populated farm cages, the risk of disease increased by unwanted growth on the cage. Unwanted growth also reduces oxygenated water flow through the cage and slows fish growth.

Another problem is fish escape. Sharks, sea lions seals and other predators are a constant threat to the stock and integrity of the screen. There is also a risk that escaped fish will breed and interbreed with wild fish and cause problems including upsetting the balance between wild species. Cod fish have been known to chew their way out of cages made from bullet proof vest fibers like Dynema and Trigger fish have chewed their way in to get shrimp. Sharks are drawn to mortalities that sink to the bottom of the cage and have entered cages to enjoy easy feeding and threaten maintenance divers.

The aquaculture facilities may be used to house many different types of fish such as halibut, haddock, cod, flounder, black sea bass, snapper, cobia, yellow tale snapper, cobia, tuna, stripped bass, mahi mahi, and so forth.

Other problems for cages are currents that can change the shape and lower effective volume of the cages, as well as the high maintenance of floating hardware and current cleaning expenses due to the present day net design.

A common problem with such facilities is the exposure to the elements wherein damage to the containment facility can quickly result in a loss of contained fish. For instance, should a facility consist of a cage with netting, a tear in the netting can result in the release of the fish into the open water or the introduction of predators into the cage. Exposure to the elements is not limited to wave action but includes predators such as sharks that work tirelessly to find or create a breech in the netting for access to the fish.

Another approach is the use of steel cages. The increase in strength is beneficial to inhibit a breech but the use of steel in saltwater causes other problems. Steel is susceptible to degradation despite the use of steel protective coatings such as galvanized steel. Further, the use of steel presents associated metal problems such as weight and degradation, and does not address the problems of marine growth. While various growth inhibitor paints are available, inclusion of such paint in close proximately to fish that are to be consumed is not an option.

There are already automatic feeders and harvesting systems to reduce labor requirements, but one of the worse remaining problems is cleaning the cage. Marine growth will attach to most materials and most of the surface is netting that is made from fine fibers that are easy for growth to attach to and is difficult to clean. Cages with excessive marine grown increase drag in the current and risk pulling of the anchoring.

Plastisol® coated steel screens have a smooth non corrosive surface have been used, but Plastisol® leaches out and cracks after a few years. Plastisol® allows growth to attach to it wherein cleaning is still required. Material fatigue remains a problem due to cycle loading of the steel.

The U.S. copper association is experimenting with a copper nickel alloy screen proven effective against growth. The copper alloy is very expensive, heavy and is susceptible to wave action metal fatigue failure. The copper is also poisonous to crustaceans like shrimp. Fatigue failure has already proven to be a problem with galvanized steel screen. Copper alloy screen is slowly removed by electrolysis and has a life expectantly of only 2-4 years in ocean water.

Dynema® and other advanced nettings are available, but it fouls the same as other netting and has found little use due to high cost. All net materials are made of small fibers that make it impossible to clean completely while installed. The small hidden growth that remains after cleaning leaves behind enough material for the start of immediate new growth.

Another product constructed from a PET net is formed like a chain link fence with a double twist at the intersection. It has been shown to be better than netting in some applications, but it is very expensive. Plastic polyethylene screen or netting is available, but it is just not strong enough for ocean demands.

Various concepts have been used to improve netting for cages such as U.S. Pat. No. 6,917,294 which employs conductive wires being integrated into the filaments of the netting. In this disclosure, the wires that are placed through the nets are arranged in a pattern so that if one of the wires is broken in a proximity that is large enough to allow fish to escape an electrical signal is sent to alert the operator of the farm of the break in the net. While this disclosure addresses the need for determining a breech in the netting, the problems of marine growth are not addressed.

Thus, what is lacking in the art is a structure and material for use in aquaculture that has significant strength, capable of most any environmental condition including predator attacks, resisting of grown from barnacles, biomass, grass or the like substances, and is light in weight.

SUMMARY OF THE INVENTION

Disclosed is a fish cage and screen for use in open ocean aquaculture. The screen is formed from a molecularly oriented single strand filament that is crossed and welded at predetermined intersections to make a net or screen configuration. The filament is molecularly oriented by usually stretching to a ratio of about 3:1. This ratio could be as low as 2:1 to a maximum of 6:1. The filament has a cross section of the filament being at least 2.0 mm in any direction. The filament is an extruded thermoplastic material made from nylon, polyester, polyethylene, polyurethane or polypropylene having a preferred cross section in a "D" or oval shape to better facilitate welding the intersections. An antimicrobial or biocide may be added to the filament. The screen or net is preferably of a bright color such as yellow, green, white or a translucent white.

The present invention recognizes the need and solves the problems with offshore cage barrier cleaning and maintenance problems by creating a barrier that is easier to clean and can accept anti growth additives that will not fall off or leach out to pollute the water. Plastics can have a flex modulas low enough for hard shells to keep attachment as it flexes. The fatigue resistance of almost all plastics is better than coated steel or copper alloy materials that have shown to have fatigue problems. A smooth high density low coefficient of friction surface slows growth and cleans superior to netting. New antimicrobials such as Biosafe®, Nanosiva® etc. will further inhibit growth and competition is already lowering prices of these products. Co-extrusion of antimicrobial thin surface can put expensive antimicrobials on the surface only of a welded screen material described in the present invention to substantially lower the cost.

Thus an objective of the invention is to disclose a screen or netting formed from a plastic material has molecular oriented fibers to provide high strength. Materials such as polyester, nylons, polyethylene and polypropylene orient well.

Another objective of the invention is to disclose a aqua cultural cage formed from multiple segments made from injection molded plastic that are mechanically connected to one another to construct an effective screen for the cage.

An objective of the invention is to disclose a fish cage screen that is resistant to intrusion from predators such as sharks.

Another objective of the invention is to disclose a fish cage screen having a color that can be interpreted by a predator as a barrier.

Yet still another objective of the invention is to disclose a fish screen having desirable memory qualities thereby containing fish from escaping by allowing the screen to return to its original position if breached.

Another objective of the invention is to disclose a fish screen having a smooth plastic surface that does not give undesired organisms a good surface to grown on and allows most growth to by wiped off.

Yet still another objective of the invention is to disclose a fish screen that is flexible to inhibit hard shell organisms from attachment.

Still another objective of the invention is to disclose a fish screen that includes an antimicrobial or biocide added to the material such as copper or zinc.

Another objective of the invention is to disclose a fish screen colored yellow, green, white, a translucent white or the like bright color for easier identification by a shark.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

BRIEF DESCRIPTION OF THE DRAWINGS

FIG. 1 is a perspective view of two pieces of screen material and a connecting member in an unassembled position;

FIG. 2 is a perspective view of two pieces of screen material and a connecting member in an assembled configuration;

FIG. 3 is a detailed view of the screens and connector member within the circle area A shown in FIG. 2;

DETAILED DESCRIPTION OF THE PREFERRED EMBODIMENT

Figure 4:
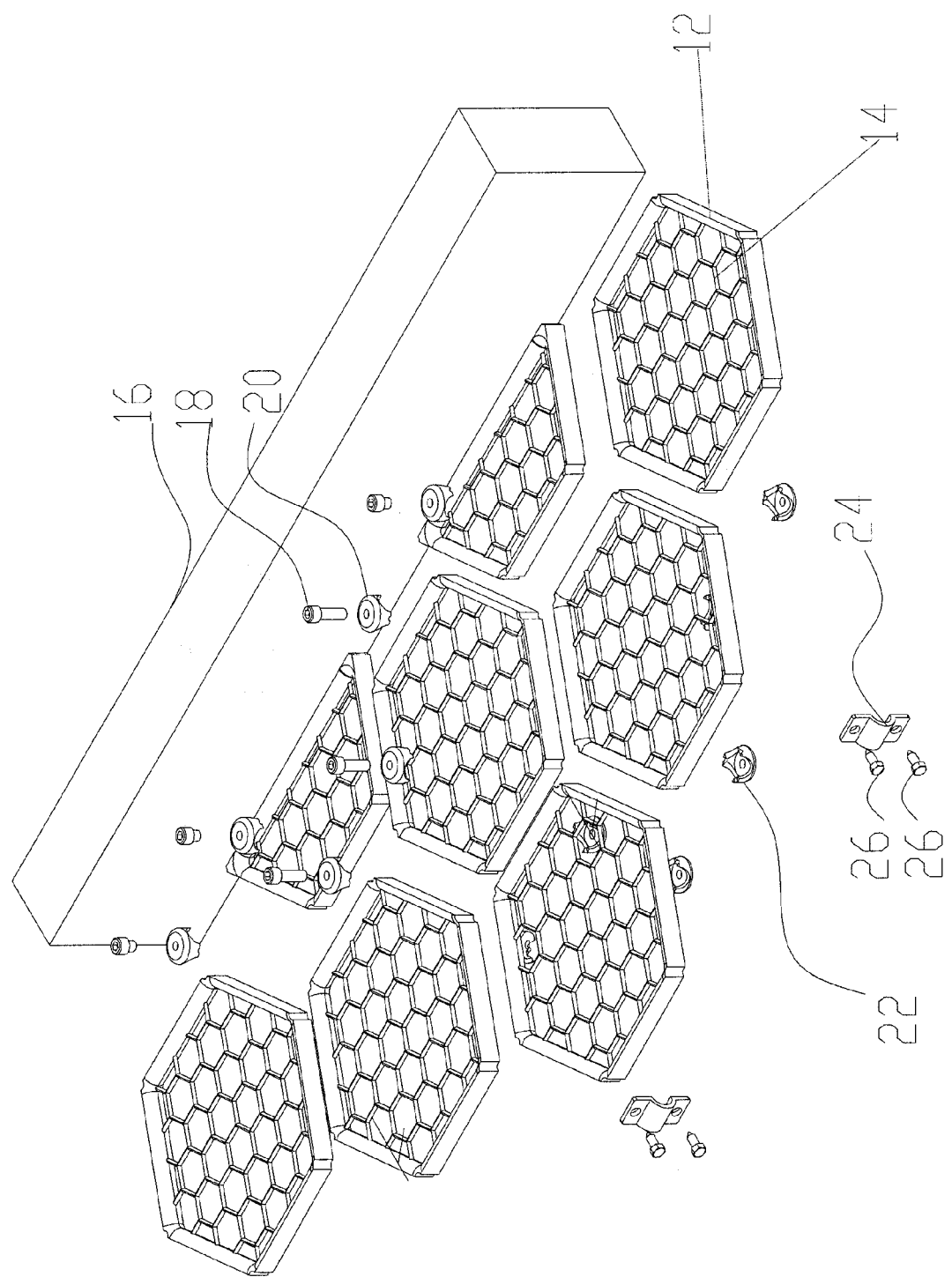
FIG. 4 shows an alternative screen embodiment showing a plurality of polygonal sections and fastening elements in an unassembled condition.

In underwater tests personally performed by myself, it has been discovered that sharks will not bite a tight flat white screen because the shark cannot protrude or rotate the jaw and teeth to an advantageous position to damage the screen. Sharks do not have bones and the jaw cartilage releases stressed teeth and new teeth are grown and rotate into place. Although the shark can replace the teeth, my testing verifies the commonly known fact that a shark does not waste their teeth if a meal seems improbable.

The use of a molecularly oriented filament screen made into sandwich or other easy to bite configuration confirms that sharks also have a difficult time destroying the screen even if it can be bitten. Tooth marks and cuts may appear, but a hole large enough for the shark to enter or fish to escape have not been seen with my test samples. When very large sharks cut mouth size sections the screen it returns to its original position because of its desirable memory qualities. The damaged area will not let the shark in or entice fish to leave. Conventional netting cannot achieve this visual recovery of a damaged area.

Tests were further conducted with a multi-color cage and loose screen equally baited for shark attach found that dark colors such as red and dark blue were attacked while white and bright green were not. Research studies by Dr. Gruber at the University of Miami have verified that sharks can see all colors very well. The bright colors are visible to the sharks better by night and very well by day. Dark colors are seen well by day and not well at night. Blue is not seen well by horizontally searching fish if it matches the background water. Sharks are usually more active at night.

Our testing in the Bahamas with sharks who are known to be very active at night demonstrate that the Sharks are more likely to bite dark colors on baited cages. The speculation is that at night it is very difficult to see dark colors. Bright colors had little or no damage from sharks and during night time hours sharks did not bite any color of a baited cage with a tight flat screen during daylight hours.

The smooth plastic surface does not provide undesired organisms a good surface to grow on and most growth easy wipes off where fibrous netting provides good gripping surfaces for growth. In addition, the flexibility of the extruded material is not ideal for hard shell organisms to attach to.

In the preferred embodiment, the screen or net is made from a single strand filament, heat, friction or sonically welded at the intersections to make a net or screen configuration. The filament being molecularly oriented by stretching ratio of about 3:1 and have a cross section of the filament being at least 2.0 mm$^2$ in any direction. The stretching ratio can range from 2:1 to as high as 6:1. The extruded thermoplastic material can be nylon, polyester, polyethylene, polyurethane or polypropylene. Generally any weldable plastic with a flex modulus between 100 ksi and 500 ksi can make a suitable screen depending of the application. Typically, these materials as large diameter monofilaments are not suitable for making nets because they are too difficult to knot or weave. However, these materials have a smooth and flexible surface that is easier to clean than conventional netting.

The filament cross section is preferably shaped in a "D" or oval shape to better facilitate welding the intersections. The intersections are ultrasonic welded together using a 20 k Hz welder. The welding has been done by ultrasonic welding at 20 KHZ with 1500 watts for less than one second depending on the filament size. Other friction welding techniques and frequencies could be utilized. The "D" shape generates a much stronger welded joint than the intersection of rounds. It also does not allow the weld to degrade the tensile strength of the filament significantly at the weld as rounds do. Another method found effective is to press or coin a flat spot in a round filament at the weld area prior to welding. This provides the benefit of an improved weld similar to the "D" shape with good line strength and lower water drag.

The final welded screen product results in a flexible panel that has a smooth cleanable surface and maintains a generally flat surface that sharks and mammals have a difficult time biting. Several plastics have been used to provide an acceptable screen with varying cost. Also antimicrobials or anti fouling can be added during the extrusion process that will be locked into the plastic and will not pollute.

Another method to form a screen for light duty applications is the use of injection molding of the screen. This does not provide the very high strength of molecular orienting the filament, but in some applications this is not necessary. Today there are continuous injection mold processes to make long sheets and many designs to attach several screen sheets together to make very large screens for large cages. This process is much less expensive than extruding and orienting filament and then welding the screen configuration. Sections have been made with screen grid diameters as small as 0.090" and 12" square. Size per single molding is limited by screen web diameter. When the size is too small it freezes off plastic flow and melt flow properties. Melt indexes of over 50 at 275 degrees C./5 kg and 40 ISO 1133 have made a one ft. square screen. With melt indexes of over 100 it is contemplated that section could be made over 3'×3' in a single molding and probably larger with continued process development.

Where maximum screen strength is not required injection molded screens work well and are less expensive and are well suited for less stressed cage panels. The materials available for injection molding included a wider envelope of suitable plastics including ABS, polycarbonate, alloys, and nylons etc. The materials are non-reinforced polymers with additives for color and antimicrobial properties It is also possible to injection mold small segments of a screen with a frame and means to connect the frames segments producing a large screen. This process produces smaller parts that are candidates for other processing that can yield antimicrobial and anti fouling surfaces that inhibit marine growth. Small screens have been injection molded for other uses in the past from pool pump screens to small filters. The limiting factor is how large can you make them before injection molded screen paths freeze off and make the part incomplete and useless. This varies dramatically with the flow properties of the plastics and part design and temperature as previously described.

Aquaculture cages will experience two types of growth, which for reference will be called soft and hard. Soft growth is bacteria, fungus, algae, diatoms and grass. Hard growths are barnacles, oysters, mussels, clams, etc. Hard growths can be inhibited with a combination of surface finish and flexibility that affect their ability to attach. Controlling hard growth with screen extruded or molded plastics can be accomplished by keeping the flex modulas low enough to allow some flexing during use. The hard growths attachment gets stressed because the shell will not flex as screen flexing occurs and they cannot maintain attachment and fall off the screen. Flex modulas of plastics of 500 ksi and lower in diameters of 3.5 mm and smaller have been found effective to release hard growths of barnicales, clams, oysters and tube worms. Tensile strength of 8,000 psi have been found suitable with a surface durometer of D 75 or higher have been found effective against predators.

Soft growths can be more difficult to control, however test have shown that they form more slowly on smooth hard surfaces and on surfaces with lower coefficient of friction like PTFE and other low coefficient of friction flouropolymers. Copper and silver are the oldest known antimicrobials and are effective against small soft growths, however weight, cost and fatigue are a problem for metal screens.

Many antimicrobial products for plastics have been developed for the medical industry. They are generally too expensive for other markets. The antimicrobial additive is usually blended into the plastic between ½ and 2% at a minimum effective quantity to control cost. Most of the antimicrobial is locked deep inside the part where it cannot be beneficial and only a small surface quantity is effective. However, this process keeps the antimicrobial locked in the polymer and does not allow the antimicrobial to pollute the environment.

One further solution is to plate a plastic screen with a final coat of copper or silver. Nickel or chrome final plating is also a dramatic improvement over just a smooth plastic surface due to its additional surface hardness and smooth high density surface.

Plastic plating became an industrial process in the 1960's, but was relatively low quality plating without great bonding and weather resistance. Originally ABS was the only plastic plated. Since then continual process improvements have made it suitable for difficult and demanding conditions like automotive grilles and many other plastics are plated and with almost any conductive metal. Any metal plated on a plastic screen used in aquaculture will reduce growth and cleaning needs due to its high density and tight molecular structure. Silver, copper and zinc have the best antimicrobial respectively.

FIG. 1 is a perspective view of two sections 2 and 4 of screen material and a connecting member 6 in an unassembled position. Each section of screen material includes a first plurality of parallel spaced molecular oriented plastic filaments 8 that are positioned in orthogonal relationship to a second plurality of parallel spaced molecular oriented plastic filaments 10. In each instance where the filaments 8 and 10 cross one another, as at intersection 9, they are welded together in the manner as previously discussed. For purposes of illustration the sections 2 and 4, shown in FIGS. 1 and 2, are square in configuration by having the same number of equally spaced filaments. The section could be rectangular in overall configuration by varying the number of filaments in one direction relative to the other or by varying the spacing between the filaments. As shown in FIGS. 2 and 3 the screen sections 2 and 4 are interconnected by connecting member 6. The connecting member 6 is interwoven between overlapping cells formed by filaments 8 and 10 in each of the sections 2 and 4. The filaments of extruded thermoplastic filaments have a cross section of about 2 mm². The filaments are spaced apart between ¼ inch and 1½ inch.

Figure 5:
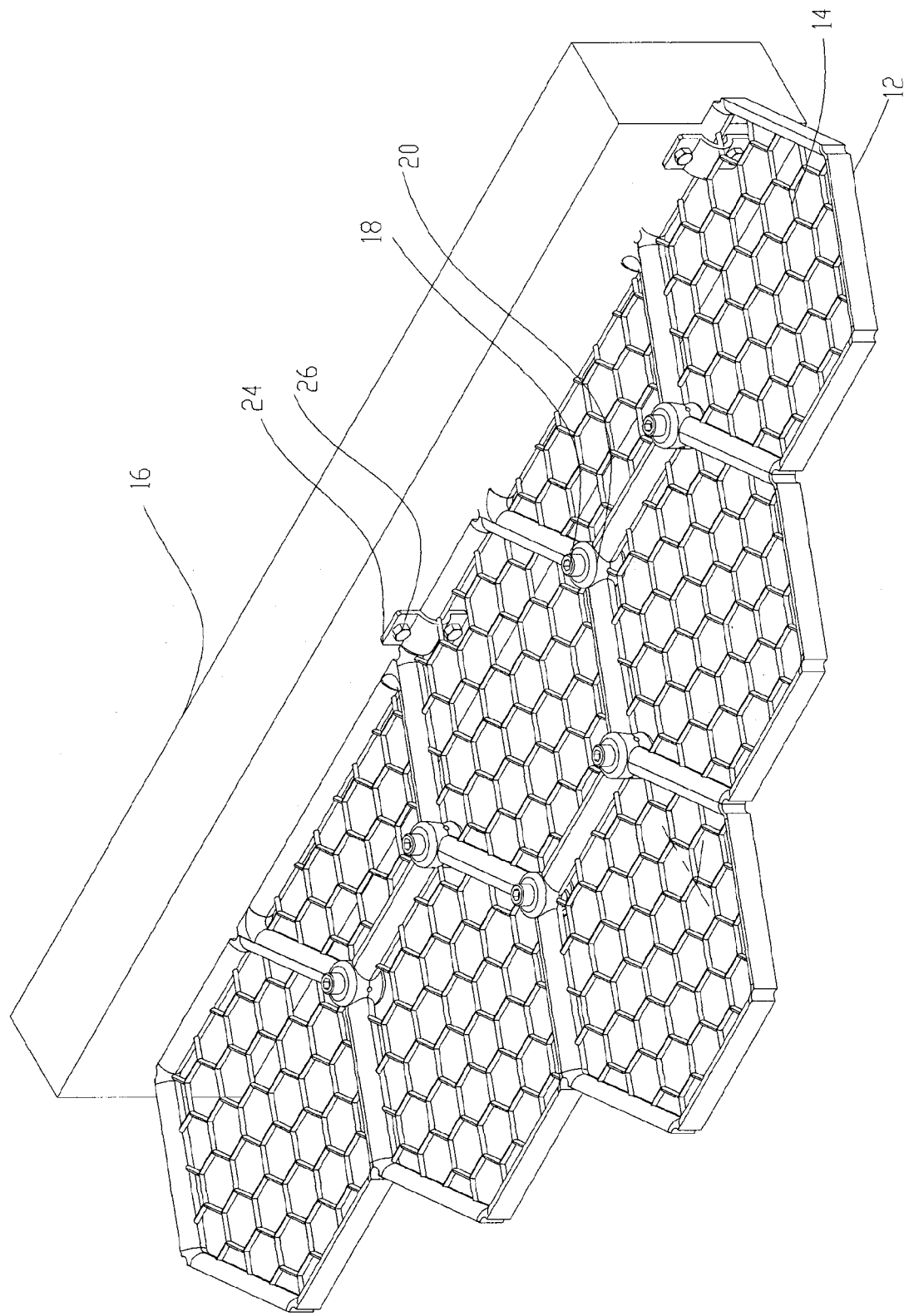
FIG. 5 is a perspective view of the screen of FIG. 4 in an assembled configuration.

FIGS. 4 and 5 show an alternative screen embodiment including a plurality of polygonal sections and fastening elements in an unassembled and assembled condition, respectively. In this embodiment the cage is formed from a plurality of polygonal segments 12 that include a mesh screen formed as polygonal shaped cells 14. Segments 12 including cells 14 are formed from plastic using an injection molding process as was described above. While the segments 12 are shown as four and six sided polygons it should be understood that polygons having three, four five, six, seven, etc. sides would work as well. Likewise the cells 14 can be polygons of three or more sides. The segments 12 are connected to one another utilizing a fastener assembly that includes a threaded male member 18 and retainer members 20 each having mating female threads. The segments 14 may be connected to a buoyant edge member 16 utilizing a series of clamps 24 and threaded fasteners 26. Many known cages have floatation attached to a separate frame, that may not be buoyant. The buoyant edge member for the instant invention need only have sufficient sealable volume to float 50% of the structure above the surface for cleaning and towing.

Figure 6:
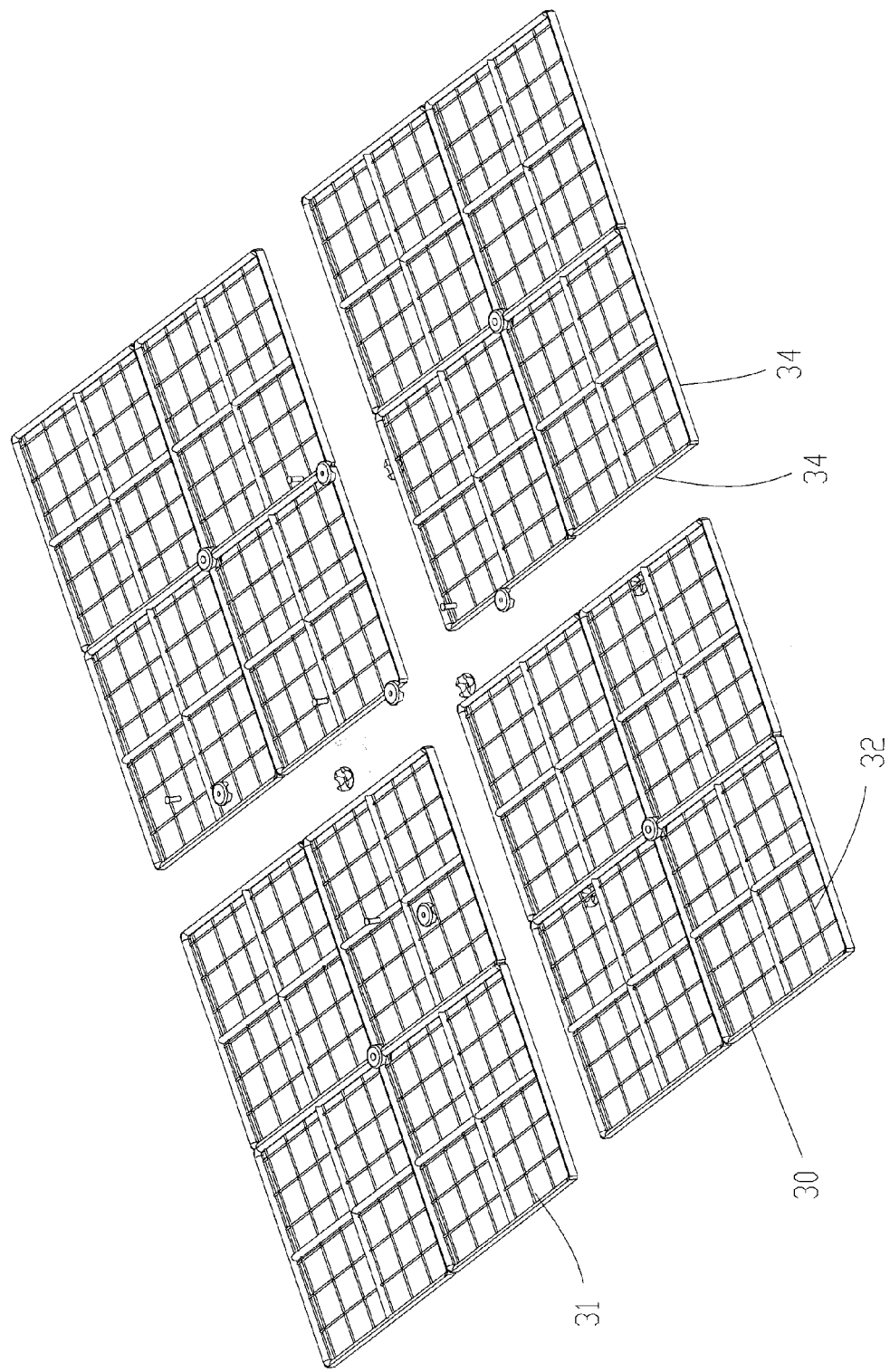
FIG. 6 illustrates a screen comprised of a plurality of square sections and fasteners in an unassembled condition.
Figure 7:
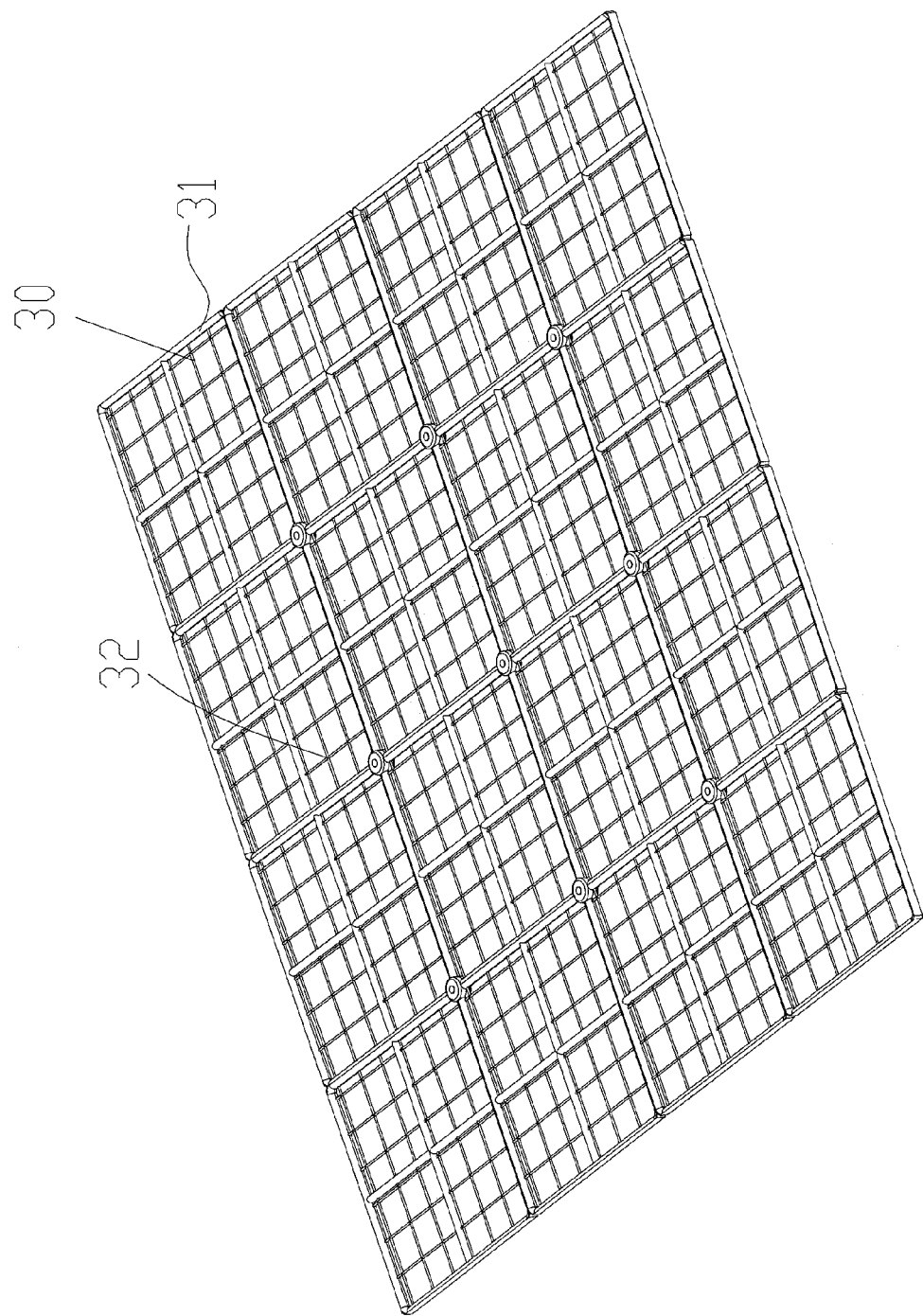
FIG. 7 illustrates the screen of FIG. 6 in an assembled condition.
Figure 8:
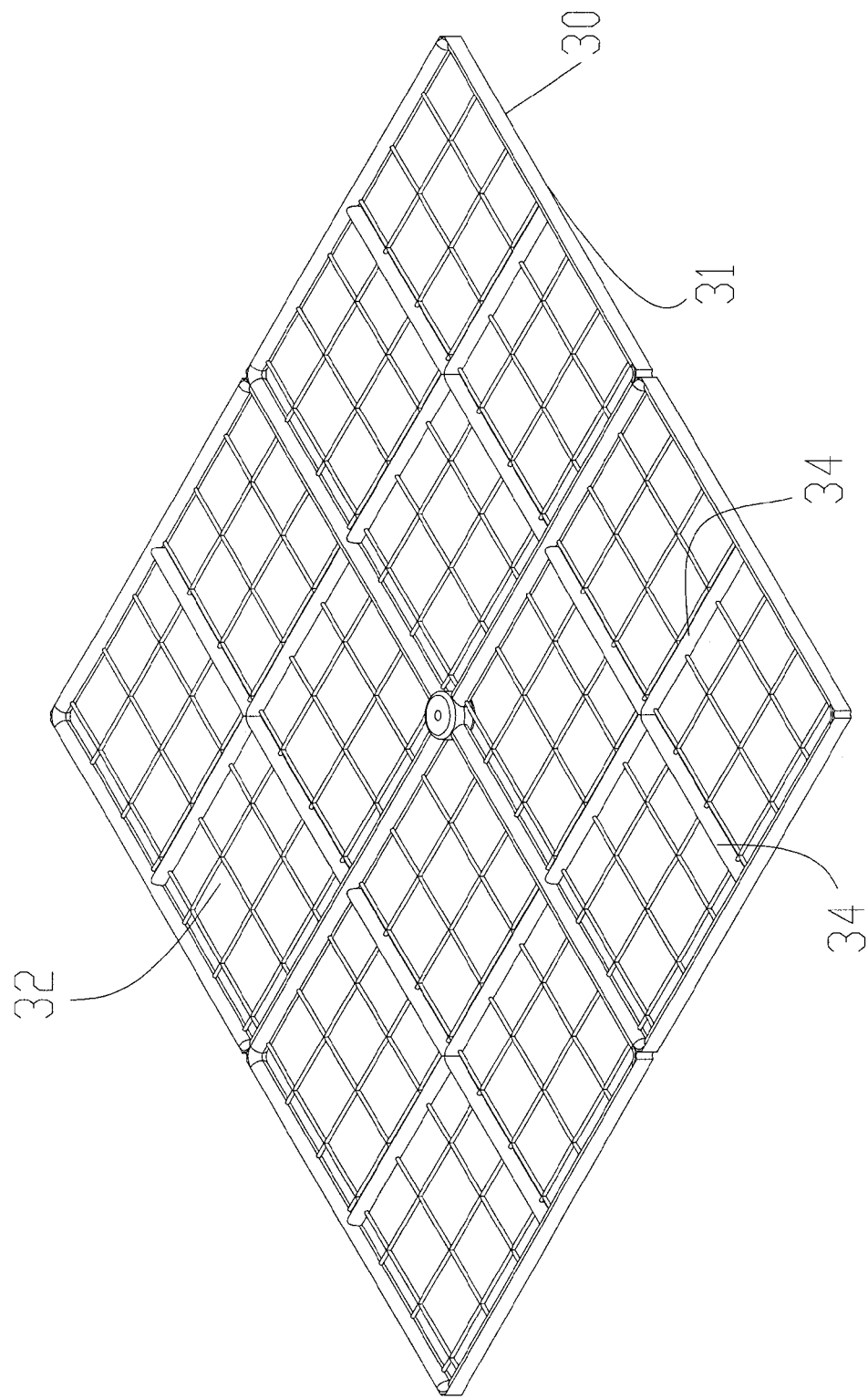
FIG. 8 is a view of a single square section.
Figure 9:
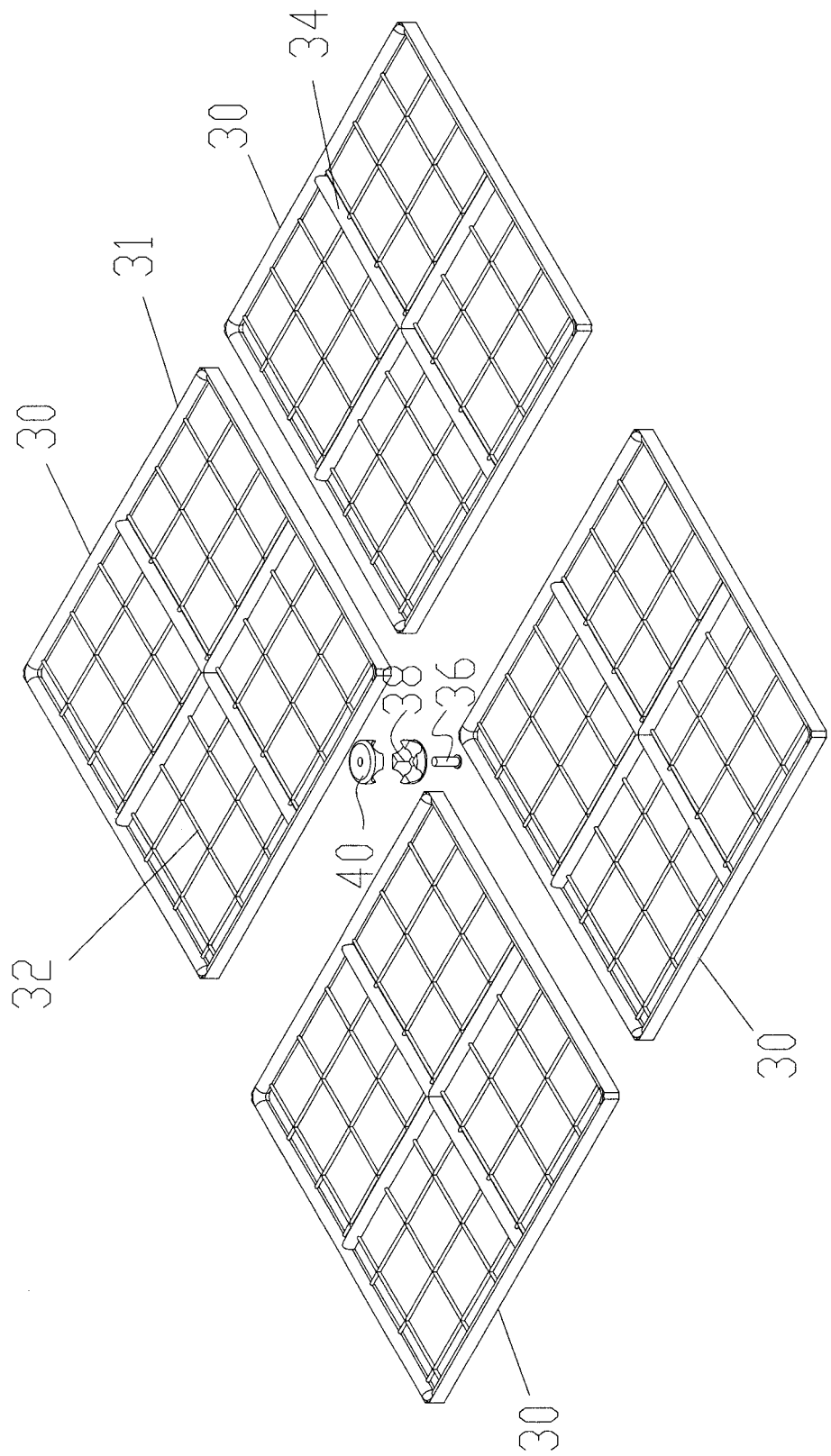
FIG. 9 is an exploded view showing four square sections and a connector member.
Figure 11:
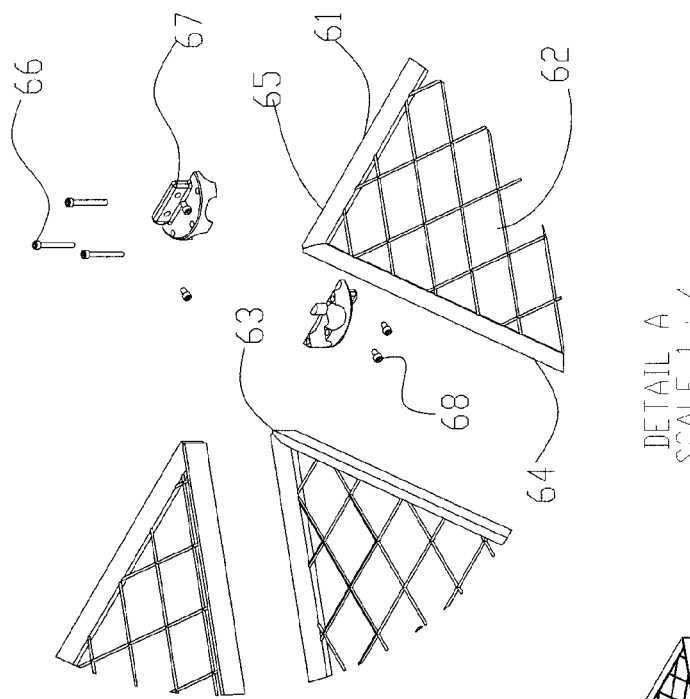
FIG. 11 is a detailed view of a portion of FIG. 10 showing the connector member.

FIGS. 6 though 9 disclose an embodiment where each screen segment 30 is generally square in configuration. These segments are formed from injection molded plastic as previously described. The segment 30 includes a square frame 31 and a pair of plastic raceways used during the injection molding process, once the screen is made the raceways operate as reinforcement ribs 34. Each rib 34 is located approximately at the midpoint of the side walls of the square frame and extends from one side of the square to the opposite side of the square segment. Interposed between the frame 31 and reinforcing ribs 34 are screens 32 that are formed as a mesh comprised of a plurality of generally square cells. Multiple segments 30 are connected to one another with a fastener assembly comprised of a threaded male member 36 and retainers 38 and 40 each including a female thread that operatively cooperates with the threads on male member 36.

The screen or net may include an antimicrobial or biocide added to the material such as copper or zinc. The screen or net is preferably of a bright color such as yellow, green, white or a translucent white.

The molded panels can be surface treated or electroplated to the plastic to further reduce fouling. The embedded electroplated anti fouling does not leave to pollute the water. Because of the smooth surface growth is slower than conventional nylon fiber netting and cleaning is faster and easier. Further improvements with antimicrobials on the surface can be effective without pollution.

Figure 10:
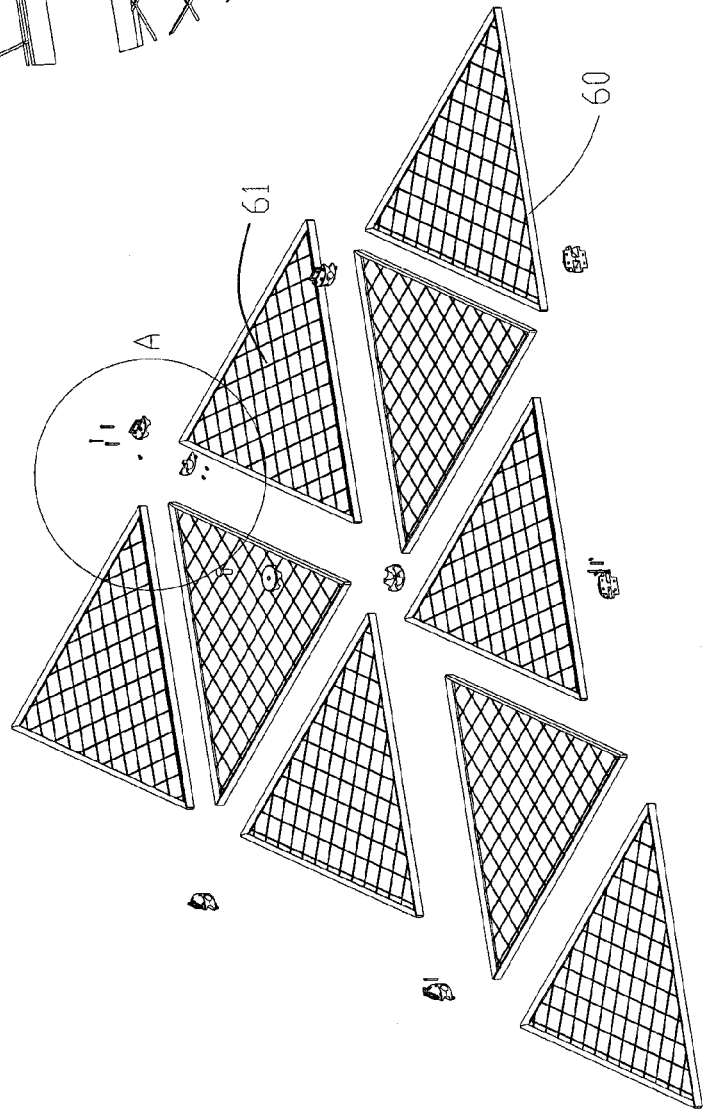
FIG. 10 is an exploded view showing three sided sections and the connector member.
Figure 12:
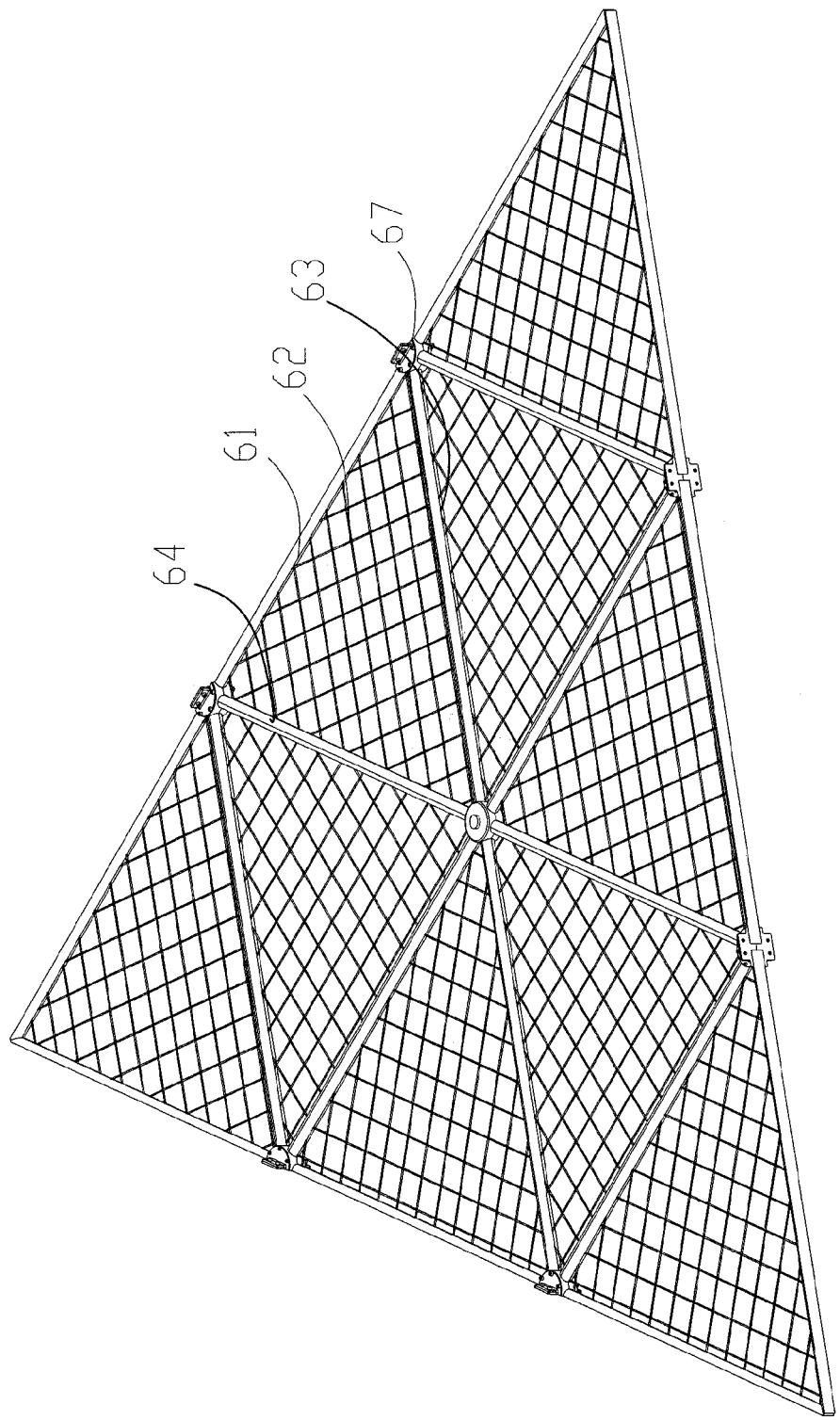
FIG. 12 illustrates the screen of FIG. 10 in an assembled condition.

FIGS. 10 though 12 disclose an embodiment where each screen segment 60 is triangular in shape. As with the previous embodiments, these are preferably formed from injection molded plastic as previously described. The segment 60 includes a three sided frame 61 having a screen 62 interposed between the side walls 63, 64 & 65. The screens 62 are formed from a mesh comprised of a plurality of generally square cells. Multiple segments 60 are connected to one another with a fastener 67 assembly comprised of threaded male members 66 and retainers 68 each including a female thread that operatively cooperates with the threads on male member 66.

The screen or net may include an antimicrobial or biocide added to the material such as copper or zinc. The screen or net is preferably of a bright color such as yellow, green, white or a translucent white.

The molded panels can be surface treated or electroplated to the plastic to further reduce fouling. The embedded electroplated anti fouling does not leave to pollute the water. Because of the smooth surface growth is slower than conventional nylon fiber netting and cleaning is faster and easier. Further improvements with antimicrobials on the surface can be effective without pollution.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should by understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fish cage screen comprising: a series of first extruded thermoplastic filaments that are positioned into a cross pattern with a second series of extruded thermoplastic filaments, said first and second series of thermoplastic filaments being welded at intersections to make a screen segment, wherein each of said thermoplastic filaments of said first and second series of extruded thermoplastic filaments is molecularly oriented by stretching ratio of at least 2:1 to about 6:1; each said screen segment mounted into a six sided frame that is connected to a plurality of like framed segments by a fastener assembly forming a fish cage screen enclosure; and at least one buoyant member that is mechanically attached to said fish cage screen.

2. The fish cage screen of claim 1 wherein each of said filaments of said first and second series of extruded thermoplastic filaments is molecularly oriented by stretching ratio of about 3:1.

3. The fish cage screen according to claim 1 wherein each of said filaments of said first and second series of extruded thermoplastic filaments has a cross section of about 2 mm$^2$ in any direction.

4. The fish cage screen according to claim 1 wherein each of said filaments of said first and second series of extruded thermoplastic filaments is formed from one of the group consisting of: nylon, polyester, polyethylene, polyurethane or polypropylene.

5. The fish cage screen according to claim 1 wherein each of said filaments of said first and second series of extruded thermoplastic filaments has a cross section shaped in a "D" or oval shape to better facilitate welding the intersections.

6. The fish cage screen according to claim 1 wherein each of said filaments of said first and second series of extruded thermoplastic filaments includes an antimicrobial or biocide.

7. The fish cage screen according to claim 1 wherein each of said filaments of said first and second series of extruded thermoplastic filaments is a bright color.

8. The fish cage screen according to claim 1 wherein a plurality of said screen segments are interconnected by use of a flat strap threaded through adjoining filaments.

9. The fish cage screen according to claim 1 wherein said filaments are spaced apart between ½ inch and 1½ inch.

10. The fish cage screen of claim 1 wherein each screen segment has a pair of injection mold raceways which further operate as reinforcement ribs, each of said reinforcement ribs extending from one side of the square segment to the opposite side of the square segment.

11. The fish cage screen of claim 1 wherein said six sided frame is adjoined to additional six sided frames by use of a fastener comprising an upper three prong retainer positioned along a corner of an inner surface of the adjoined frames and a lower three prong retainer positioned along an outer surface thereof, said upper and lower retainer coupled together by a threaded male member securable to a retainer member having female threads.

* * * * *